(12) United States Patent
Lai et al.

(10) Patent No.: US 8,295,421 B1
(45) Date of Patent: Oct. 23, 2012

(54) DATA COMMUNICATIONS CIRCUITRY WITH HIGH JITTER TOLERANCE

(75) Inventors: Thiam Sin Lai, Bayan Lepas (MY); Siew Leong Lam, Petaling Jaya (MY)

(73) Assignee: Altera Corporation, San Jose, CA (US)

( * ) Notice: Subject to any disclaimer, the term of this patent is extended or adjusted under 35 U.S.C. 154(b) by 393 days.

(21) Appl. No.: 12/616,105

(22) Filed: Nov. 10, 2009

(51) Int. Cl.
  *H04L 7/00* (2006.01)
(52) U.S. Cl. ............... 375/355; 375/371; 375/373
(58) Field of Classification Search ........... 375/316, 375/272, 355, 371, 373
  See application file for complete search history.

(56) References Cited

U.S. PATENT DOCUMENTS

| | | | |
|---|---|---|---|
| 5,056,118 A | 10/1991 | Sun | |
| 5,504,785 A | 4/1996 | Becker et al. | |
| 6,545,507 B1 | 4/2003 | Goller | |
| 6,646,478 B2 | 11/2003 | Lamb | |
| 8,023,590 B2* | 9/2011 | Darr et al. | 375/316 |
| 2003/0115542 A1* | 6/2003 | Hwang et al. | 714/798 |

OTHER PUBLICATIONS

"SDI MegaCore Function User Guide," Chapter 3, p. 25-29, Altera Corporation, Nov. 2009.
"Part 3: Carrier sense multiple access with collision detection (CSMA/CD) access method and physical layer specifications," IEEE Std 802.3-2002 (Revision of IEEE Std 802.3, 2000 Edition), Mar. 2002.

* cited by examiner

*Primary Examiner* — Phuong Phu
(74) *Attorney, Agent, or Firm* — Treyz Law Group; Jason Tsai

(57) ABSTRACT

Integrated circuits with data communications circuitry are provided. The data communications circuitry on an integrated circuit may receive data that was transmitted from another integrated circuit at a data rate. The data communications circuitry may include oversampling circuitry that oversamples the data to produce an oversampled version of the data at an oversampled data rate. Downsampling circuitry in the data communications circuitry may be used to downsample the oversampled data. The downsampling circuitry may include cascaded groups of registers that store the oversampled data. The outputs of each of the groups of registers may be combined to form a combined parallel output. A downsampling control circuit may have a multiplexer that selects a subset of the signals from the combined parallel output in response to control signals from a transition detector. A middle bit detector may extract a bit value from the selected subset to use as the downsampled output.

18 Claims, 3 Drawing Sheets

DATA COMMUNICATIONS CIRCUITRY WITH HIGH JITTER TOLERANCE

BACKGROUND

This invention relates to data communications circuitry, and more particularly, to data communications circuitry with tolerance for jitter.

Integrated circuits often contain data communications circuitry. A transceiver on one integrated circuit may transmit data that is received by a transceiver at another integrated circuit.

The presence of jitter can adversely affect the performance of a communications link. Some links therefore use oversampling schemes to reduce the impact of jitter. In a typical oversampling scheme, oversampling circuitry is used at both the transmitting and receiving ends of the communications link. Following oversampling at a transmitter, the oversampled data is transmitted over the link. At the receiver, downsampling circuitry is used to reconstruct the original data stream. Although conventional oversampling schemes can help reduce the sensitivity of a communications link to the adverse impact of jitter, the need for oversampling circuitry at the transmitter can introduce unwanted complexity into a system.

It would therefore be desirable to be able to provide improved data communications circuitry such as communications circuitry that exhibits tolerance to jitter.

SUMMARY

Integrated circuits may be provided with data communications circuitry that exhibits enhanced jitter tolerance.

Data may be transmitted from a transmitting integrated circuit and received at a receiving integrated circuit. The transmitting integrated circuit may transmit data at a core data rate without using oversampling. Data communications circuitry in the receiving integrated circuit may receive incoming data at the core data rate that has not been oversampled. At the receiving integrated circuit, the incoming data that has been received may be oversampled to produce oversampled incoming data at a data rate that is higher than the core data rate. The data communications circuitry may include downsampling circuitry that downsamples the oversampled incoming data. The downsampling circuitry may use a downsampling algorithm that removes redundant bits from the oversampled incoming data and outputs corresponding bit values at the core data rate. Downsampling the oversampled incoming data in this way may enhance jitter tolerance.

Further features of the data communications circuitry, its nature and various advantages will be more apparent from the accompanying drawings and the following detailed description.

DETAILED DESCRIPTION

Figure 1:
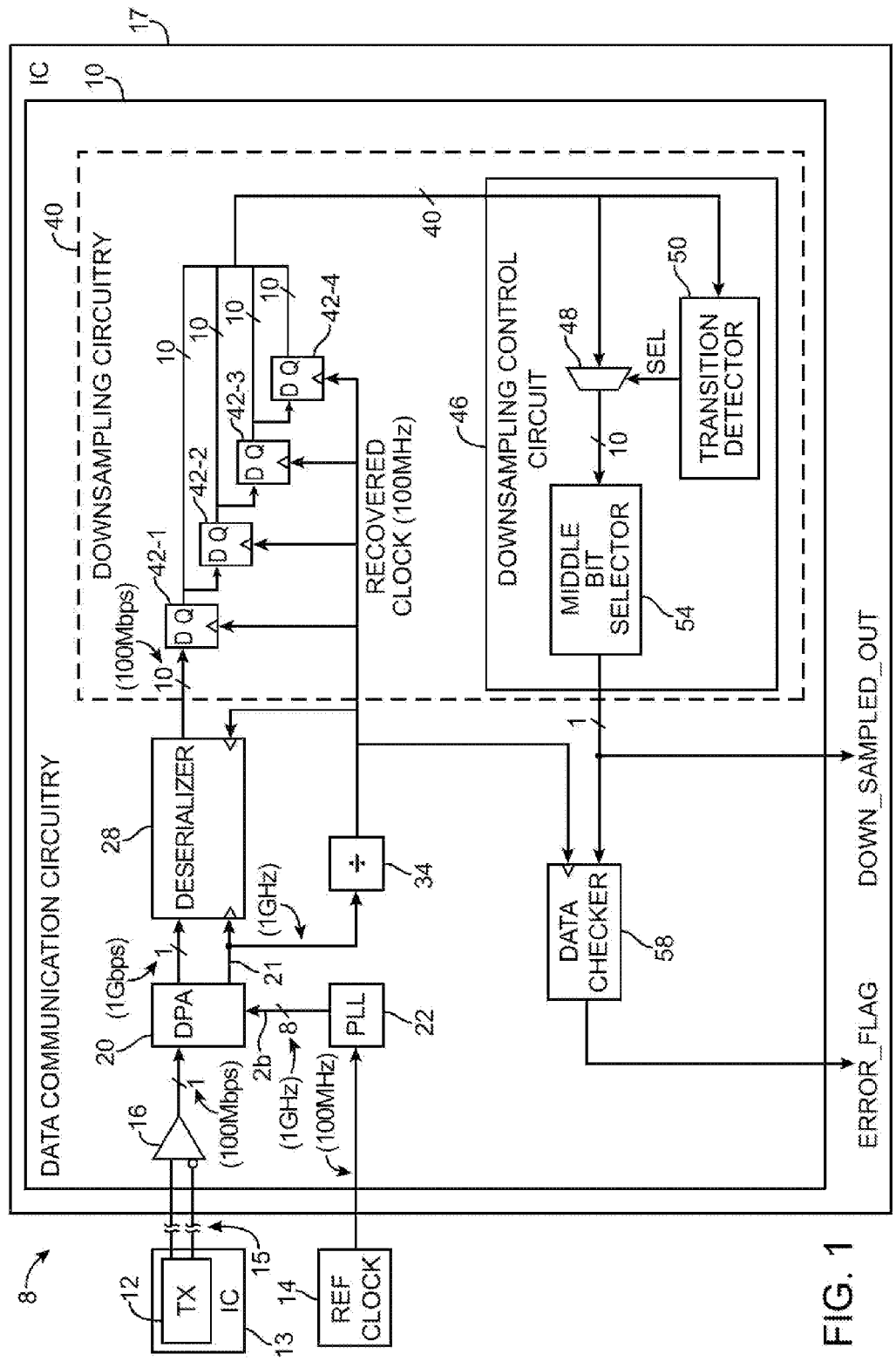
FIG. 1 is a schematic diagram of an illustrative data communications circuitry in accordance with an embodiment of the present invention.

Data communications circuitry can be used to transmit or receive data on an integrated circuit. For example, data communications circuitry can be used in input-output (I/O) blocks, transceivers, serial digital interfaces (SDI), triple speed Ethernet (TSE) links, or other applications that involve the transmission and reception of data. With one typical scenario, which is sometimes described herein as an example, data is transmitted between integrated circuits. These integrated circuits may, for example, be located in a system (e.g., they may be mounted to a common printed circuit board or may communicate through a system backplane).

During the normal processing of data on an integrated circuit, data is typically clocked using a system clock. For example, an integrated circuit may have a 400 MHz clock. When transmitting data to a remote integrated circuit, other data rates may be used. For example, high-speed communications scheme may involve converting parallel data (e.g., 4 bits of data at 400 MHz) into higher speed serial data (e.g., data at 1.6 Gbps).

Other data transmission schemes may involve a reduction in the data rate relative to the internal logic of an integrated circuit. For example, an integrated circuit may have a system clock of 400 MHz, but data may be transmitted in a serial link with a 200 MHz rate (e.g., at 200 Mbps).

The rate at which data is transmitted over a communications link from a transmitting integrated circuit to a receiving integrated circuit is sometimes referred to as the "core data rate" for that link. In the preceding discussion, 1.6 Gbps and 200 Mbps are examples of core data rates. The core data rate may correspond to the natural operating speed of the logic on the transmitting integrated circuit or may be stepped up or down from that speed. At least some of the digital input-output circuitry that is used to feed the digital data to the output drivers in the data communications circuitry of the transmitting integrated circuit is typically operating at the core data rate. For example, an output register or other circuitry may be used in a transmitter to feed data to a differential output driver that is coupled to a differential communications line. In this type of arrangement, the output register is generally clocked at a clock rate that is tied to the core data rate. For example, the output register may be clocked at 1.6 GHz if the output data is being transmitted over the communications link at 1.6 Gbps or may be clocked at 200 MHz in a scenario in which serial data is being transmitted at 200 Mbps.

Due to system noise, data that is transmitted over a communications link may exhibit timing variations called jitter. Excessive jitter can interfere with proper data reception and is therefore undesirable.

To properly receive and process incoming data from a data communications link between a transmitting integrated circuit and a receiving integrated circuit, data communications circuitry on the receiving integrated circuit may be provided with oversampling circuitry. The oversampling circuitry can be used to oversample the incoming data. Processing circuitry such as deserializer circuitry and downsampling circuitry can then process the oversampled data before it is used by digital logic on the receiving integrated circuit.

Oversampling is a process in which a stream of digital data at a core rate is sampled at an oversampling rate that is higher than the core data rate (e.g., using an oversampling clock that has a higher clock rate than the clock used to clock the output register circuitry on the transmitting integrated circuit).

Downsampling is a technique in which oversampled data is processed (e.g., by sampling at a downsampling rate) to convert the oversampled data back into a stream of data at its original data rate (e.g., the core data rate).

An illustrative system in which data may be transmitted between a transmitter at a transmitting integrated circuit and a receiver at a receiving integrated circuit is shown in FIG. 1. In data communications system 8, transmitter 12 may be located in transmitting integrated circuit 13 and may transmit data to data communications circuitry 10 on integrated circuit 17 over communications link 15 (e.g., a differential link formed from a pair of conductive lines in a cable or on a printed circuit board).

Transmitter 12 may transmit data at a core data rate (i.e., without oversampling). In the illustrative arrangement of FIG. 1, which is sometimes described herein as an example, the core data rate is 100 megabits per second (Mbps). The core data rate can, in general, have any suitable value. Transmitter 12 may transmit data (e.g., in the form of differential signals) over a pair of wires in link 15 or any suitable communications channel.

Data communications circuitry 10 may form part of a transceiver block on integrated circuit 17 (i.e., data communications circuitry 10 may serve as receiver circuitry corresponding to transmitter circuitry 12). If desired, circuit 17 may also have a transmitter and circuit 13 may have a corresponding receiver. The optional transmitter on circuit 17 and corresponding receiver on circuit 13 are not shown in FIG. 1 to avoid over-complicating the drawing.

As shown in FIG. 1, data communications circuitry 10 may have an input buffer 16 that receives transmitted data from transmitter 12. Input buffer 16 may have a differential input and a single-ended output. Input buffer 16 may receive serial data over link 15 in differential form (e.g., as serial differential data that is one-bit wide) and may convert this differential data into a corresponding stream of single-ended data (e.g., data that is referenced to ground). Both the differential data at the differential input to input buffer 16 and the corresponding single-ended digital data at the output of buffer 16 may be serial data at the core data rate (100 Mbps in the present example).

Reference clock 14 may provide a reference clock signal on its output. Reference clock may, for example, be located on the same printed circuit board as integrated circuit 17 (as an example). The reference clock signal that is provided by clock 14 may have a frequency suitable for generating a higher-speed sampling clock. This higher-speed sampling clock may be used in oversampling received data (i.e., for oversampling data that has a data rate equal to the core data rate). As an example, the reference clock may have a frequency of 100 MHz. The reference clock signal may be fed to phase-locked loop (PLL) circuit 22. Phase-locked loop circuit 22 may produce a set of corresponding output clocks based on the reference clock signal. For example, phase-locked loop circuit 22 may produce eight clock signals each of which has a frequency of 1 GHz and each of which has a different phase (e.g., each having a different respective one of eight equally-spaced phases). If desired, phase-locked loop circuit 22 may provide more than eight clock signals or fewer than eight clock signals. The eight clock signals that are produced at the output of phase-locked loop circuit 22 each have a frequency that is an integer multiple of the frequency of the reference clock signal. For example, in a scenario in which the integer multiple is equal to ten and the reference clock signal has a frequency of 100 MHz, the eight clock signals may each have a frequency of 1 GHz (e.g., the reference clock signal frequency of 100 MHz multiplied by ten). Because the clock signals at the output of phase-locked loop circuit 22 have different phases, these signals are sometimes referred to as clock phases.

The incoming data to circuitry 10 may be fed to a first input of a dynamic phase aligner (DPA) 20. The eight clock signals may be fed to a second input of DPA 20. DPA 20 may select an oversampling clock to be used in oversampling the incoming data from the eight available clock signals. DPA 20 can select the oversampling clock that exhibits best phase alignment with the incoming data. The oversampling clock may have an oversampling rate that is equal to the frequency of the selected one of the eight clock signals (e.g., 1 GHz). DPA 20 may use the oversampling clock internally to oversample the incoming data to produce an oversampled incoming data. For example, the oversampled incoming data may be one bit wide and may have a data rate of 1 Gbps because the incoming data is oversampled by an oversampling clock at 1 GHz (in the present example). DPA may also supply the selected sample clock (i.e., the oversampling clock) at output 21.

The oversampled data that is produced at the output of DPA 20 may be provided to an input of deserializer 28. The oversampled incoming data at this input may be a one bit serial bit stream. Deserializer 28 may perform a serial-to-parallel conversion on the serial oversampled data stream so that the oversampled incoming data is converted to deserialized (parallel) data. The deserialized data may be supplied on a parallel output bus that has a bit width equal to the integer multiple described in connection with phase-locked loop 22. The deserialized data may, for example, be provided on a ten bit parallel output, as shown in FIG. 1. Deserializer 28 may process the oversampled incoming data at a rate controlled by the oversampling clock. Deserializer 28 may receive the oversampling clock over line 21.

The oversampling clock may be routed to frequency divider 34. Frequency divider 34 may divide the oversampling clock by the same integer multiple that is used by phase-locked loop circuit 22 in converting the reference clock to the eight clock phases on path 26.

For example, frequency divider 34 may divide the frequency of the oversampling clock by ten. Frequency divider 34 may provide a recovered clock on its output that has the same frequency as the frequency of reference clock (e.g., 100 MHz). The recovered clock may also be phase aligned to the incoming data.

The deserialized data and recovered clock may be fed to downsampling circuitry 40. The deserialized data may be controlled by the recovered clock. The deserialized data may have a data rate that is slower than data rate of the oversampled incoming data. The deserialized data may have a data rate of 100 Mbps (as an example).

Downsampling circuitry 40 may include a first register circuit 42-1, a second register circuit 42-2, a third register circuit 42-3, and a fourth register circuit 42-4. Each register circuit includes multiple parallel registers. For example, register circuit 42-1 includes a bank of ten parallel registers each of which receives an input from a corresponding one of the ten lines connected to the output of deserializer 28. Register circuits 42-2, 42-3, and 42-4 may likewise each contain a set of ten registers. Register circuits such as register circuits 42-1, 42-2, 42-3, and 42-4 are sometimes referred to herein as registers. The number of registers shown in downsampling circuitry 40 in the example of FIG. 1 is merely illustrative. Other numbers of registers may be used if desired.

Deserialized data from deserializer 28 may be provided to an input of first register 42-1. Each register 42 acts as a buffer for the deserialized data and may hold multiple bits (e.g., ten bits). Each register may also be controlled by the recovered clock that is supplied from the output of divider 34. Registers 42 may be cascaded sequentially (e.g., the output of the first register 42-1 may serve as an input to the second register 42-2, the output of the second register 42-2 may be routed to the input to the third register 42-3, etc.). The contents of one register may be transferred to the next cascaded register once every clock cycle (i.e., once per cycle of the recovered clock).

The output of registers 42 may be combined to form a combined parallel output. The combined parallel output may have a bit width equal to the sum of the bit width of each register 42. For example, the combined parallel output of registers 42 in the example of FIG. 1 may have a width of forty bits because there are four registers 42, each holding ten bits.

The combined parallel output may be fed to a downsampling control circuit 46. Downsampling control circuit 46 may have a transition detector 50 and a multiplexer 48. Transition detector 50 and multiplexer 48 may receive the combined parallel output from registers 42 as inputs. Registers 42 store oversampled data bits that cover a number of data bits at the core data rate. To convert the oversampled bits back to valid data at the core data rate, a sampling window is used. Transition detector 50 may determine the initial location of the sampling window within the individual registers of register circuits 42-1, 42-2, 42-3, and 42-4. By analyzing the contents of registers 42, transition detector 50 may detect a transition (e.g., a transition from logic value "1" to logic value "0" and vice versa) within the initial sampling window.

Transition detector 50 may control multiplexer 48 to select a group of consecutive parallel bits. The group of consecutive parallel bits can be any number of consecutive bits taken from the combined parallel output. The group of consecutive parallel bits may be ten bits wide (as an example).

The group of consecutive parallel bits may be fed to middle bit selector 54. Middle bit selector 54 may select a middle bit from the group of consecutive parallel bits to use in producing a downsampled output. For example, if the middle bit that is selected from the group of consecutive oversampled bits is a logic one, middle bit selector 54 will output a logic one to be used as signal DOWN_SAMPLED_OUT at the output of downsampling control circuit 46. The downsampled output may be one bit wide. For example, middle bit selector may select the fifth or sixth bit from the ten consecutive parallel bits that have been selected by multiplexer 48. The downsampled output at the output of middle bit selector 54 (i.e., signal DOWN_SAMPLED_OUT at the output of downsampling circuitry 40) represents a bit of incoming data at the core data rate (i.e., a fully received and processed bit from the 100 Mbps data stream that was transmitted over link 15).

If desired, the downsampled output of downsampling control circuit 46 may be provided to an optional data checker 58. Data checker 58 may be controlled by the recovered clock. Data checker 58 may incorporate a linear feedback shift register (LFSR) to produce a pseudo-random bit stream (PRBS). Data checker 58 can be used to check the validity of the downsampled output. Data checker 58 may provide an error flag output that indicates when erroneous bits are detected (e.g., by asserting signal ERROR FLAG).

Figure 2A:
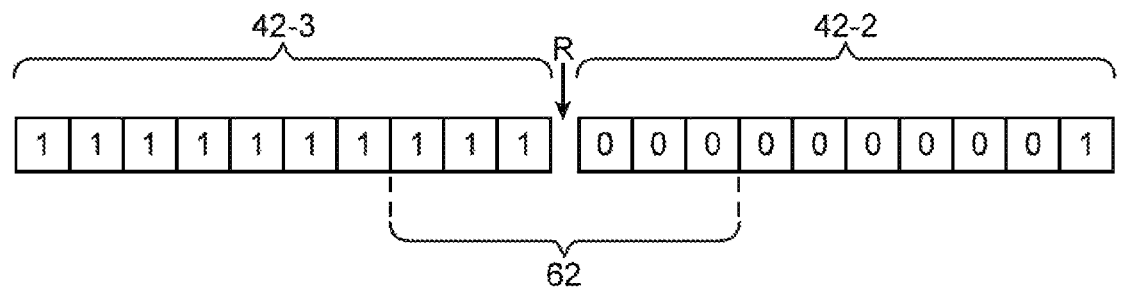
FIGS. 2A, 2B, and 2C are diagrams of illustrative registers showing a moving sampling window that may be used in data communications circuitry of the type shown in FIG. 1 in accordance with an embodiment of the present invention.
Figure 2B:
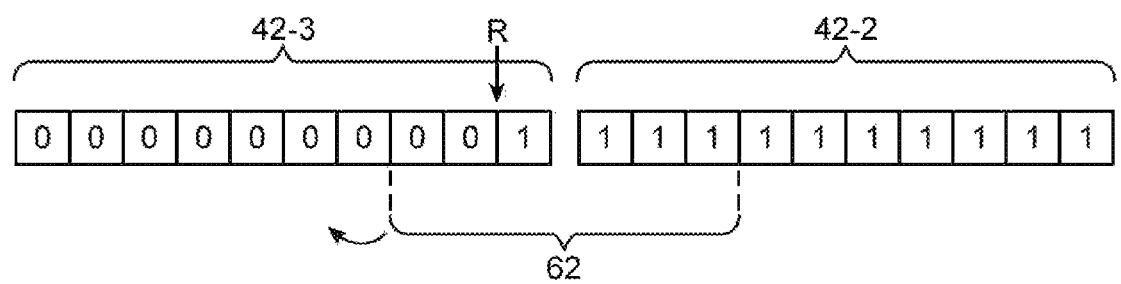
Figure 2C:
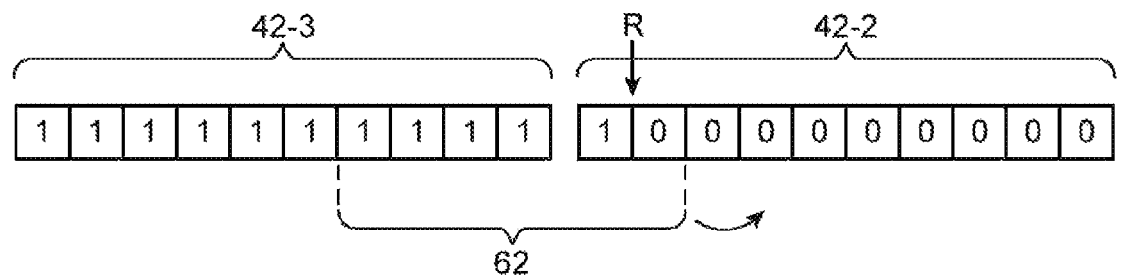

FIGS. 2A, 2B, and 2C are illustrative examples showing how downsampling circuitry 40 may produce a downsampled output based on the bits that have been stored in registers 42. As described in connection with FIG. 1, transition detector 50 may receive the combined parallel output from registers 42 as an input. Transition detector 50 may continually update the location of a sampling window within registers 42. If jitter events arise that cause the location of the transition edges in the incoming data to shift in time, transition detector 50 can alter the current location of the sampling window so that the window continues to straddle the edges of the data bits. Over time, the location of the sampling window can be continually updated to follow the location of the transition (edge) in the incoming data (i.e., to track the jittering edge of the data). The amount of jitter that can be accommodated by register circuits 42 depends on the number of individual registers (storage buffers) that are used. If, for example, there are forty individual registers, forty oversampled bits can be stored. In a 10× oversampling scenario, this corresponds to four unit intervals (i.e., up to for UI of jitter can be accommodated).

An initial sampling window (initial sampling window 62) is shown in FIG. 2A. Initial sampling window 62 of FIG. 2A encompasses the bits near the edge between the middle two registers (e.g., the second register 42-2 and the third register 42-3). Transition detector 50 analyzes the bits in sampling window 62 and attempts to identify the presence of a transition in sampling window 62. In the example of FIG. 2A, there is a transition R that is aligned with the boundary between register 42-3 and 42-2. Transition detector 50 may store the location of this transition. In this example, transition detector 50 has a sampling window size of six bits. A wider or narrower sampling window may be used, if desired.

Due to jitter, the position of transition R will tend to wander among registers 42. To accommodate this drift in the data edge, transition detector 50 may update the location of the sampling window. For example, sampling window 62 may be shifted during a subsequent clock cycle if transition R is no longer located at the center of sampling window 62. In a scenario in which jitter causes the location of transition R to move to the left of the center of the original sampling window 62 (i.e., the transition is shifted toward the most significant bit (MBS)), the sampling window may be shifting to the left (toward the MSB) in the next clock cycle, as shown in FIG. 2B.

Jitter may also lead to situations in which the transition R moves to the right. Transition detector 50 can also detect this movement and can again update the sampling window location.

In the example of FIG. 2C, the sampling window is initially in the position to which it was shifted during the operations of FIG. 2B (i.e., one bit to the left of the original position of FIG. 2A). Due to jitter, transition R has shifted two bits to the right of the transition in FIG. 2B (i.e., the transition is shifted towards the least significant bit (LSB)). Accordingly, transition detector 50 may update the position of sampling window 62 by shifting sampling window 62 two bits to the right (towards the LSB) in the next clock cycle, as shown in FIG. 2C. Note that in FIG. 2C, transition R is detected at the edge of sampling window 62. Transition detector 50 would not have detected the transition if more jitter had been present, because the transition would not have fallen within the sampling window. If desired, the width of sampling window 62 may be increased to more than six bits to accommodate higher amounts of jitter.

Sampling window 62 may be repeatedly shifted to the right and left as needed to accommodate for jitter. The total amount of shifting that is permitted is determined by size of registers 42. For example, when shifting sampling window 62 to the left, sampling window 62 may only be shifted to the edge of the final register (e.g., the fourth register 42-4). The total jitter tolerance therefore depends on the number of registers. In the present example, the total jitter tolerance is four unit intervals (UI) because four register circuits 42 are being used as buffers and because each register accommodates one UI of oversampled data. The number of registers may be increased to achieve higher jitter tolerance or may be reduced to conserve resources.

Figure 3:
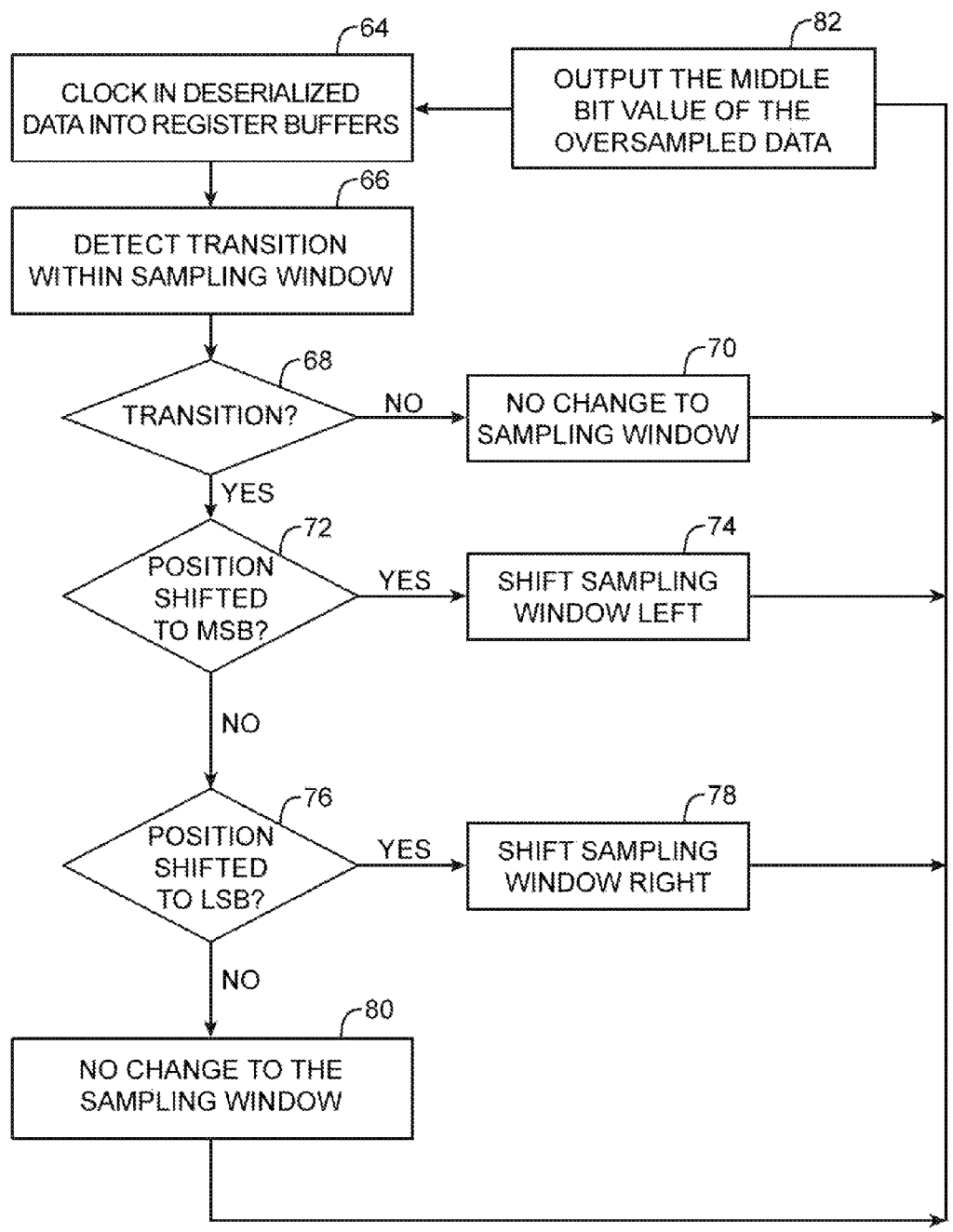
FIG. 3 is a flow chart of illustrative steps involved in downsampling oversampled incoming data in data communications circuitry of the type shown in FIG. 1 in accordance with an embodiment of the present invention.

Transition detector 50 may be implemented in the form of a state machine. The state machine may execute a downsampling algorithm of the type shown in FIG. 3 (as an example).

At step 62, the recovered clock shifts the deserialized data into the first register 42. During the same clock cycle, the contents of each register 42 are shifted from one register to the next register. The outputs for registers 42 are combined to form the combined parallel output.

At step 66, transition detector 50 determines the location of an initial sampling window 62 (e.g., a sampling window position where the center of the sampling window is at the midpoint of the combined parallel output).

At step 68, transition detector 50 determines whether or not a transition exists within sampling window 62. If transition detector 50 does not detect a transition, the location of sampling window 62 is not changed (step 70). If transition detector 50 detects a transition, transition detector 50 may compare the location of transition R to the location of the center of sampling window 62.

At step 72, transition detector 50 determines whether the location of transition R has moved to the left of the location of the center of sampling window 62 (i.e., whether the position of the transition has shifted towards the MSB). If the location of transition R has shifted to the left of the location of the center of sampling window 62, the location of sampling window 62 may be shifted left towards the MSB by a corresponding amount (step 74). If the location of transition R has not shifted to the left of the current location of the center of sampling window 62, transition detector proceeds to step 76.

At step 76, transition detector 50 determines whether the location of transition R has moved to the right of the location of the center of sampling window 62 (i.e., to determine whether the transition position has shifted towards the LSB). If the location of transition R has moved to the right of the current location of the center of sampling window 62, sampling window 62 may be shifted right towards the LSB (step 78). If the location of transition R is not to the left of the location of the midpoint of sampling window 62, sampling window need not be moved (step 80).

Transition detector 50 may select a group of consecutive bits using multiplexer 48 (i.e., by controlling the state of multiplexer 48 using control signal SEL of FIG. 1). The group of consecutive bits that is selected by multiplexer 48 may be ten bits wide (as an example). The group of ten consecutive bits may represent the ten bits immediately following transition R. At step 82, middle bit selector 52 processes the group of consecutive bits to produce the downsampled output. For example, middle bit selector 52 may use the value of the fifth or sixth bit among the group of ten consecutive bits as the value of the downsampled output (DOWN_SAMPLED_OUT). The downsampled output may represent the desired bit value corresponding to the incoming data (i.e., DOWN_SAMPLED_OUT will serve as a successfully received version of the 100 Mbps data stream conveyed over path 15). Following generation of a bit of downsampled output, the loop of FIG. 3 may be repeated starting at step 64.

Downsampling circuitry 40 and data checker 58 may be implemented using programmable integrated circuits such as programmable logic device integrated circuits. The use of programmable integrated circuits such as programmable logic device integrated circuits allows the data communications circuitry 10 to be reconfigured by a user if it is desired to provide for increased jitter tolerance (at the expense of using more register circuits 42) or if it is desired to conserve resources (e.g., by eliminating some of circuits 42 at the expense or reduced jitter tolerance).

The foregoing is merely illustrative of the principles of this invention and various modifications can be made by those skilled in the art without departing from the scope and spirit of the invention.

What is claimed is:

1. Data communications circuitry comprising:
    an input operable to receive data that has been transmitted over a communications link from a transmitter at a core data rate;
    circuitry operable to oversample the received data to convert the received data into an oversampled version of the data having a data rate that is an integer multiple of the core data rate; and
    downsampling circuitry that includes registers operable to latch a plurality of bits of the oversampled version of the data using a clock signal having a clock rate that is equal to the core data rate.

2. The data communications circuitry defined in claim 1 further comprising a dynamic phase aligner circuit containing the circuitry operable to oversample the received data.

3. Data communications circuitry that receives data that has been transmitted over a communications link from a transmitter at a core data rate, the data communications circuitry comprising:
    an input that receives the data that was transmitted at the core data rate;
    circuitry that oversamples the received data to convert the received data into an oversampled version of the data that has a data rate higher than the core data rate;
    a deserializer that receives the oversampled version of the data and that deserializes the oversampled version of the data; and
    a transition detector that receives the oversampled version of the data and that identifies data transitions within the oversampled version of the data.

4. Data communications circuitry on an integrated circuit that receives digital data at a data rate from another integrated circuit over a communications path, comprising:
    circuitry that oversamples the received data at an oversampling rate that is greater than the data rate to generate an oversampled version of the received data;
    a deserializer that deserializes the oversampled version of the received data;
    a plurality of registers that receive the oversampled version of the received data from the deserializer over a plurality of parallel lines, wherein the registers have outputs that collectively form a combined parallel output, and wherein the registers are organized in cascaded groups of registers; and
    a downsampling control circuit that downsamples the oversampled version of the received data in the plurality of registers to produce downsampled output data at the data rate.

5. The data communications circuitry defined in claim 4 wherein the downsampling control circuit comprises a transition detector that receives the combined parallel output and that identifies data transitions within the oversampled version of the data by applying a sampling window to the combined parallel output.

6. The data communications circuitry defined in claim 4, wherein the downsampling control circuit comprises:
    a transition detector that receives the combined parallel output; and
    a multiplexer controlled by the transition detector that receives the combined parallel output and that supplies a selected subset of signals from the combined parallel output to a multiplexer output in response to control signals from the transition detector.

7. The data communications circuitry defined in claim 6 wherein the circuitry that oversamples the received data comprises a dynamic phase alignment circuit that receives multiple clock phases.

8. The data communications circuitry defined in claim 6 wherein the downsampling control circuit further comprises a middle bit selector with an input that receives signals from the multiplexer output.

9. The data communications circuitry defined in claim 8, wherein the middle bit selector is configured to select a middle bit from its input and is configured to output the middle bit as the downsampled output data.

10. The data communications circuitry defined in claim 8 further comprising a phase-locked loop circuit that produces a plurality of clock phases, wherein the circuitry that oversamples the received data comprises a dynamic phase alignment circuit that receives each of the multiple clock phases and that uses a given one of the multiple clock phases to oversample the received data.

11. The data communications circuitry defined in claim 4 wherein the groups of registers include at least four cascaded groups of registers having at least ten outputs each that are combined to form the combined parallel output.

12. An integrated circuit operable to receive digital data at a data rate from another integrated circuit over a communications path, comprising:
   circuitry operable to oversample the received data at an oversampling rate that is greater than the data rate to generate an oversampled version of the received data;
   a deserializer that receives the oversampled version of the data and that deserializes the oversampled version of the data; and
   downsampling circuitry operable to process the oversampled version of the received data and operable to produce a corresponding downsampled output at the data rate, wherein the downsampling circuitry comprises:
   registers operable to latch the oversampled version of the data presented at the output of the deserializer, wherein the registers have outputs that form a combined parallel output;
   a multiplexer operable to select a subset of signals from the combined parallel output; and
   a bit selector operable to select one bit from the subset of signals to use as the downsampled output.

13. The integrated circuit defined in claim 12 further comprising a downsampling control circuit operable to use a sampling window to produce the corresponding downsampled output from data bits in the registers.

14. The integrated circuit defined in claim 12 wherein the registers are organized in cascaded groups of registers.

15. The integrated circuit defined in claim 12 further comprising a transition detector operable to control the multiplexer.

16. The integrated circuit defined in claim 12 further comprising:
   a phase-locked loop circuit operable to receive a reference clock and operable to produce a corresponding set of distinct clock phases, wherein the circuitry that oversamples the received data comprises a dynamic phase alignment circuit operable to receive the corresponding set of distinct clock phases from the phase-locked loop circuit.

17. The data communications circuitry defined in claim 1, wherein the registers have outputs that form a combined parallel output, further comprising:
   a multiplexing circuit operable to select a subset of signals from the combined parallel output.

18. The data communications circuitry defined in claim 1, wherein the control circuit is further operable to generate a downsampled output by downsampling the oversampled version of the data, further comprising:
   a data checking circuit operable to determine whether the downsampled output is erroneous.

* * * * *